US012620852B2

(12) United States Patent
Ruthes

(10) Patent No.: US 12,620,852 B2
(45) Date of Patent: May 5, 2026

(54) ROTOR FOR ROTARY ELECTRIC MACHINE, MANUFACTURING METHOD AND CORRESPONDING ROTARY ELECTRIC MACHINES

(71) Applicant: WEG EQUIPAMENTOS ELÉTRICOS S.A., Jaraguá do Sul (BR)

(72) Inventor: Jacques Roberth Ruthes, Jaraguá do Sul (BR)

(73) Assignee: WEG EQUIPAMENTOS ELÉTRICOS S.A. (BR)

( * ) Notice: Subject to any disclaimer, the term of this patent is extended or adjusted under 35 U.S.C. 154(b) by 218 days.

(21) Appl. No.: 18/266,466

(22) PCT Filed: Dec. 11, 2020

(86) PCT No.: PCT/BR2020/050539
§ 371 (c)(1),
(2) Date: Jun. 9, 2023

(87) PCT Pub. No.: WO2022/120443
PCT Pub. Date: Jun. 16, 2022

(65) Prior Publication Data
US 2023/0387739 A1      Nov. 30, 2023

(51) Int. Cl.
*H02K 17/16*      (2006.01)
*H02K 1/28*      (2006.01)
(Continued)

(52) U.S. Cl.
CPC .............. *H02K 1/28* (2013.01); *H02K 15/02* (2013.01); *H02K 15/12* (2013.01); *H02K 17/16* (2013.01); *H02K 2201/09* (2013.01)

(58) Field of Classification Search
CPC .......... H02K 1/28; H02K 15/02; H02K 15/12; H02K 2201/09; H02K 15/023; H02K 17/20
See application file for complete search history.

(56) References Cited

U.S. PATENT DOCUMENTS 3,264,695 A      8/1966   Summers et al.
5,640,064 A   *  6/1997   Boyd, Jr.   ............... H02K 5/225
                                                  310/216.069
(Continued)

FOREIGN PATENT DOCUMENTS

BR        7904053  A      3/1980
BR        0504776  A      9/2007
(Continued)

OTHER PUBLICATIONS

S. Taghavi and P. Pillay, "An innovative rotor core assembly for high performance 4-pole synchronous reluctance traction motor using grain oriented lamination," 2015 IEEE International Electric Machines & Drives Conference (IEMDC), 2015, pp. 90-95, doi: 10.1109/IEMDC.2015. 7 409042.
(Continued)

*Primary Examiner* — Thomas Truong
(74) *Attorney, Agent, or Firm* — McCarter & English, LLP

(57)      ABSTRACT

The present invention relates to a rotor (100) for a rotary electric machine, in which each package of plates (300) of the rotor (100) comprises, at both ends or end sections thereof, at least one first inverted plate (311) and at least one last inverted plate (312), said plates being inverted in relation to the other plates (310) of the package of plates (300).

8 Claims, 3 Drawing Sheets

(51) Int. Cl.
    *H02K 15/02*     (2006.01)
    *H02K 15/12*     (2006.01)

(56)           References Cited

U.S. PATENT DOCUMENTS

| | | | |
|---|---|---|---|
| 6,058,596 A | 5/2000 | Jansen et al. | |
| 2005/0134137 A1 | 6/2005 | Sweo | |
| 2012/0286618 A1 | 11/2012 | El-Refaie | |
| 2014/0049134 A1* | 2/2014 | Koka | H02K 17/20 |
| | | | 310/211 |
| 2017/0054351 A1* | 2/2017 | Ishikawa | H02K 15/023 |
| 2019/0312473 A1* | 10/2019 | Ikuta | H02K 11/215 |

FOREIGN PATENT DOCUMENTS

| | | | |
|---|---|---|---|
| BR | 112013006772 A2 | 7/2016 | |
| BR | 112013027434 A2 | 1/2017 | |
| FR | 3069729 A1 | 2/2019 | |
| JP | S5942170 A | 3/1984 | |

OTHER PUBLICATIONS

C. Desai, H. R. Mehta and P. Pillay, "Fabrication and Assembly Method for Synchronous Reluctance Machines," in IEEE Transactions on Industry Applications, vol. 54, No. 5, pp. 4227-4235, Sep.-Oct. 2018, doi: 10.1109/TIA.2018.2836975.

S. Panda, R. K. Keshri and A. Vidyadharan, "Design and Fabrication of Synchronous Reluctance Motor for Light Electric Vehicle Applications," 2019 IEEE Transportation Electrification Conference (ITEC-India), 2019, pp. 1-6, doi: 10.1109/ITEC•India48457.2019.ITECINDIA2019-38.

Corresponding PCT Application No. PCT/BR2020/05039 Search Report and Written Opinion Dated May 20, 2021.

Corresponding EP Application No. 20964449.1 Supplementary European Search Report Dated Jan. 8, 2024.

* cited by examiner detail A (2:1)

detail B (2:1)

ROTOR FOR ROTARY ELECTRIC MACHINE, MANUFACTURING METHOD AND CORRESPONDING ROTARY ELECTRIC MACHINES

CROSS-REFERENCE TO RELATED APPLICATIONS

This patent application is a 35 U.S.C. § 371 National Stage filing of International Application No. PCT/BR2020/ 050539, filed on Dec. 11, 2020, the disclosure of which is incorporated herein by reference in its entireties.

FIELD OF APPLICATION

The present invention pertains to the field of rotary electric machines, including manufacturing and assembly methods thereof, in particular variable frequency asynchronous induction electric machines, notably electric machines equipped with rotors with short-circuited coils and with one or more cages.

BACKGROUND OF THE INVENTION

Rotary electric machines or simply electric motors are equipment used to transform electric energy into mechanical energy, in the case of motors, and vice versa, in the case of generators. They consist of essentially four basic structures, which are the housing, stator, rotor, and bearings/caps.

The housing is the element responsible for integrating the other structures, encasing the stator and rotor.

The stator is the static active (energized) component responsible for conducting the magnetic flow to rotate the rotor, in the case of motors, and conducting the energy generated by the rotor, in the case of generators, while the rotor is the active (energized) rotary component of the rotary electric machine.

The bearings and caps are the elements responsible for coupling the static parts to the rotary parts of a rotary electric machine.

In addition to these elements, depending on the distinct features of each rotary electric machine, there may be auxiliary systems such as excitation, cooling, lubrication, among others.

The rotor, on the other hand, is basically composed of a shaft onto which a package of sheet or plates fixed together is arranged to form a package of plates that is sufficiently structured to withstand the use conditions of a motor, such as centrifugal force, temperature and others features which can influence and compromise the dimensional stability of the rotor set.

The rotors of the motors addressed herein have through holes or openings or longitudinal grooves formed in the package of plates itself and parallel to the rotor shaft, in which each radially equidistant hole set, when filled with conductive material (forming bars) and having the ends joined by conductive material (short-circuit ring), form a cage, the same rotor can have one or more cages.

Double-cage rotors basically have a cage closer to the motor shaft or lower and one closer to the outer surface of the package of plates or higher, in which the outer cage takes advantage of the skin effect to improve start performance, at which point the frequency of the currents in the rotor bars is equal to or close to the frequency of the supply line.

Induction rotary electric machines can be powered by frequency converters producing a three-phase voltage system of variable frequency and amplitude, and the start of the electric machine controlled by a frequency converter does not imply a large start current. Instead, the stator frequency is reduced to a value close to the nominal slip frequency and the voltage amplitude is determined to produce the nominal flux. As such, obtaining the necessary start torque does not demand stator currents greater than the nominal current.

Therefore, given that frequency-controlled induction electric machines are not exposed to the nominal voltage in the start condition, they do not need to have their leakage inductance increased, as limiting the starting current is not necessary. They can therefore be equipped with single cage rotors with open holes, which result in a smaller leakage flux, lower leakage inductance, and higher maximum torque value.

However, due to the number of holes in magnetic circuits being constructively limited and the non-sinusoidal field distribution in conductors, the windings of an induction machine contain electromotive forces with higher order harmonics. In addition to said harmonics, there are also those imposed onto the motor by the supply voltage generated by the frequency converter.

Said harmonics cause electric currents with equal frequency and the amplitude of said currents in the rotor is directly proportional to the amplitudes of the electromotive force frequency component and inversely proportional to the winding impedance. Note that the winding impedance at higher frequencies is predominantly determined by the leakage reactance. This is why reducing the leakage inductance causes an increase in current amplitude in the windings caused by the harmonics, fundamental and higher order, increasing current ripple and thus Joule losses in the windings.

The adverse effects of high frequency losses can be avoided by using double cages with different materials, shaping the magnetic circuits of the stator and rotor, so as to reduce the electromotive forces induced by the distortions of higher order harmonics.

One possible solution is using a single-cage rotor, in which the lower (working) holes are filled with conductive material, for example, by injecting aluminum, while the upper holes are filled with insulating air, so as to simulate an equivalent opening of the rotor bridge.

This solution, however, has some drawbacks such as the need of using complex injection tools with additional accessories and/or one or more outermost plates and/or short-circuit rings on at least one end or other additional parts to contain the aluminum and, in particular, the risk of the aluminum migrating to the outer cage during the injection procedure.

STATE OF THE ART

There are several solutions in the state of the art for asynchronous electric machines with rotors with more than one cage. Every one of them seeking solutions which improve the working parameters, in particular the start features.

One example is patent document BR112012003600B1 which discloses and describes a cage rotor for an asynchronous motor, which includes starting bars to improve starting behavior, in addition to a process for producing such a cage rotor. The cage rotor of this solution includes, as described in its abstract, a rotor package of plates with holes and operating bars arranged in the holes. Said bars contact the base of the hole internally located, turned to the radial direction of the cage rotor, directly on the rotor package of plates, in which the operating bars have a partial coating which coats a surface of the operating bars externally located, turned in the radial direction of the cage rotor, in which the material of the operating bars has a greater specific conductivity than the material of the partial coating.

The rotor from BR112012003600B1 is a typical squirrel-cage construction but despite having a double cage, the working holes (lower cages) are filled with conductive material by pressure injection method, while the upper cages are also filled with conductive material. The concern of this known state-of-the-art solution is therefore to improve the motor starting conditions and not to reduce high-frequency losses which, despite being mentioned, are not addressed by the document. In addition to coating the end of the working hole, which requires more expensive manufacturing steps, there is a free space between the rotor cages. Said free space, although intended to reduce additional high-frequency losses, does so modestly when the motor is supplied directly from the power supply network and almost innocuously when the motor is supplied by a frequency converter/inverter. Furthermore, this arrangement is apparently only possible for copper rods, which likewise increases material and manufacturing costs.

Finally, BR112012003600B1 also does not describe or suggest how to isolate the holes in the upper and lower cages from each other during the injection process.

Another state-of-the-art solution is described by patent document US20200244150, which discloses a method for manufacturing a rotor with an injected cage of a rotary electric machine, in which the rotor includes a magnetic package of plates defining holes in which bars made of a first electrically conductive material are injected. In said method, a second electrically conductive material, different from the first, is injected using an injection machine, from the front of the package of plates, the bars being held at their rear end against the pressure associated with the injection by a positioning tool that passes through a cavity used to form a short-circuiting ring on the rear of the package of plates.

The invention described by US20200244150 deals with a rotor with a double cage, the second (bottom) hole can contain injected aluminum (or any other conductive material) and there is a small channel to prevent the conductive material of a cage from invading the holes the other during the injection process.

Despite having a double cage with a conductive material inserted in the lower (working) cage, the upper cage is also filled with conductive material, acting in the reduction of fundamental losses and not in the reduction of high frequency losses. Furthermore, despite detailing a small channel to prevent one conductive material from exceeding the limit of the other conductive material during the injection process, a counter-pressure tool is used to retain the material during the injection, i.e., it does not teach or even suggests alternatives to the relevant prior art.

As can be inferred from the description above, there is space and demand for an electric motor rotor solution that overcomes the disadvantages of the state of the art, in particular that increases the reliability of injection processes by reducing manufacturing time and costs and that simultaneously reduces high frequency losses while also being robust.

OBJECTS OF THE INVENTION

One of the objects of the present invention is, therefore, providing a rotor for a double-hole rotary electric machine with an off-centered upper hole and inverted outermost plates.

Another object of the present invention is providing a manufacturing process for a rotor for a double-hole rotary electric machine with an off-centered upper hole and inverted outermost plates.

Another object of the present invention is providing a rotary electric machine equipped with a double-hole rotor with an off-centered upper hole and inverted outermost plates.

Yet another object of the present invention is providing a rotary electric machine equipped with a double-hole rotor with an off-centered upper hole and inverted outermost plates manufactured by the described manufacturing process.

Additional features and details thereof are presented in the dependent claims.

BRIEF DESCRIPTION OF THE DRAWINGS

For a better understanding and visualization of the object, the present invention will now be described with reference to the appended figures, representing the obtained technical effect through an example embodiment without limiting the scope of the present invention, in which, schematically.

DETAILED DESCRIPTION OF THE INVENTION

Figure 1:
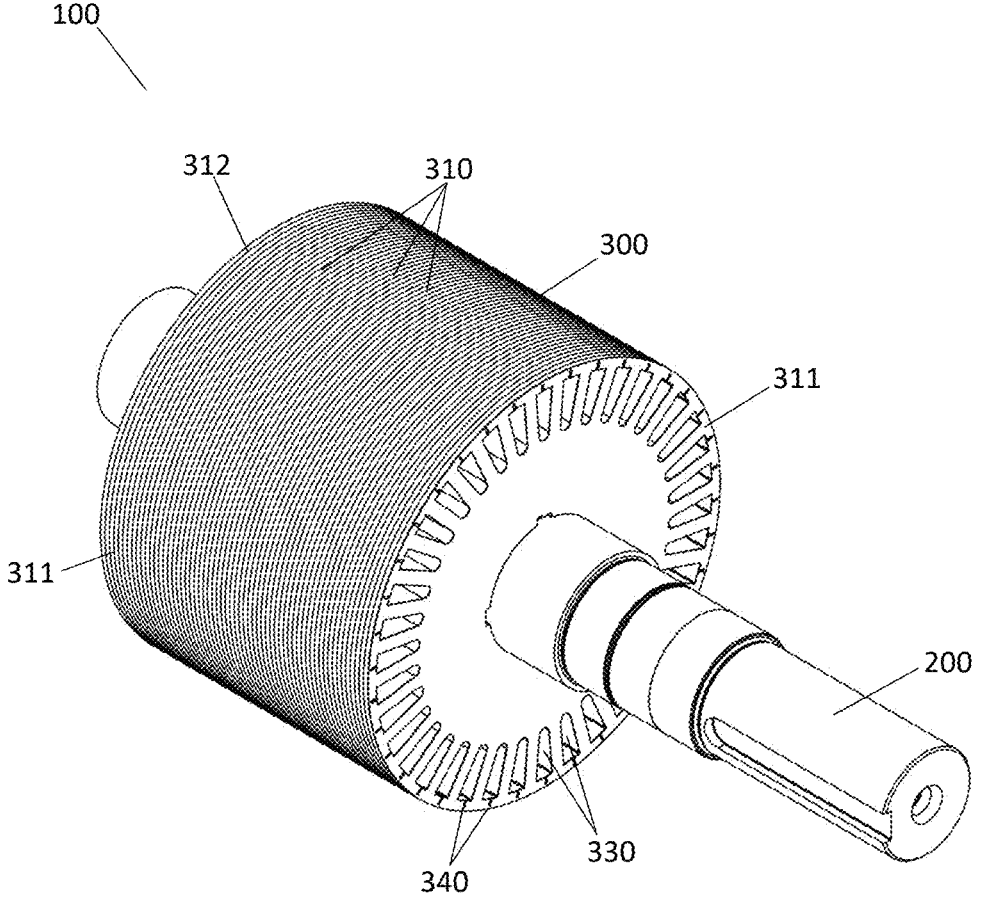
FIG. 1 shows a perspective view of a rotor according to the invention, with the package of plates assembled on the shaft.
Figure 2:
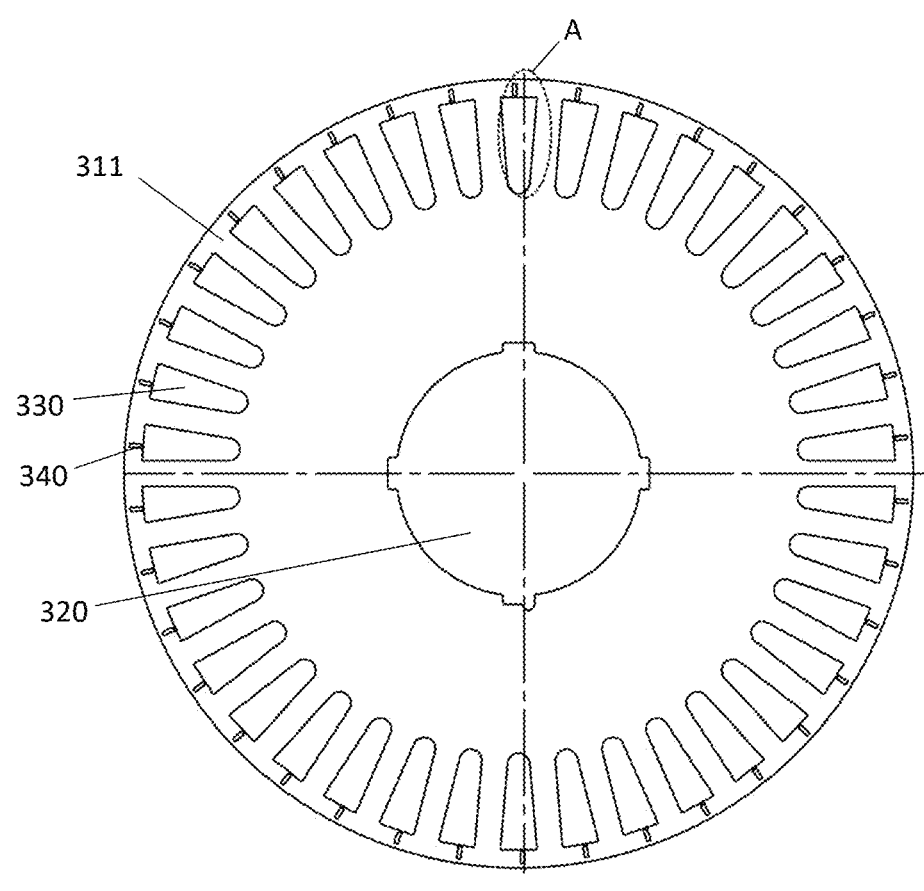
FIG. 2 shows a front view of a plate of the rotor package of plates from FIG. 1.
Figure 3:
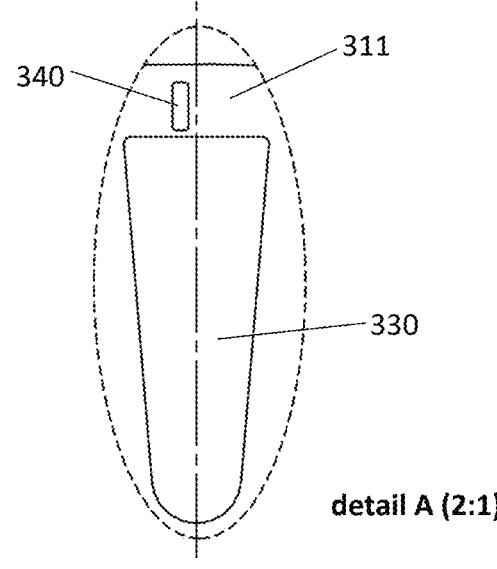
FIG. 3 shows an enlarged view of detail A from FIG. 2.
Figure 4:
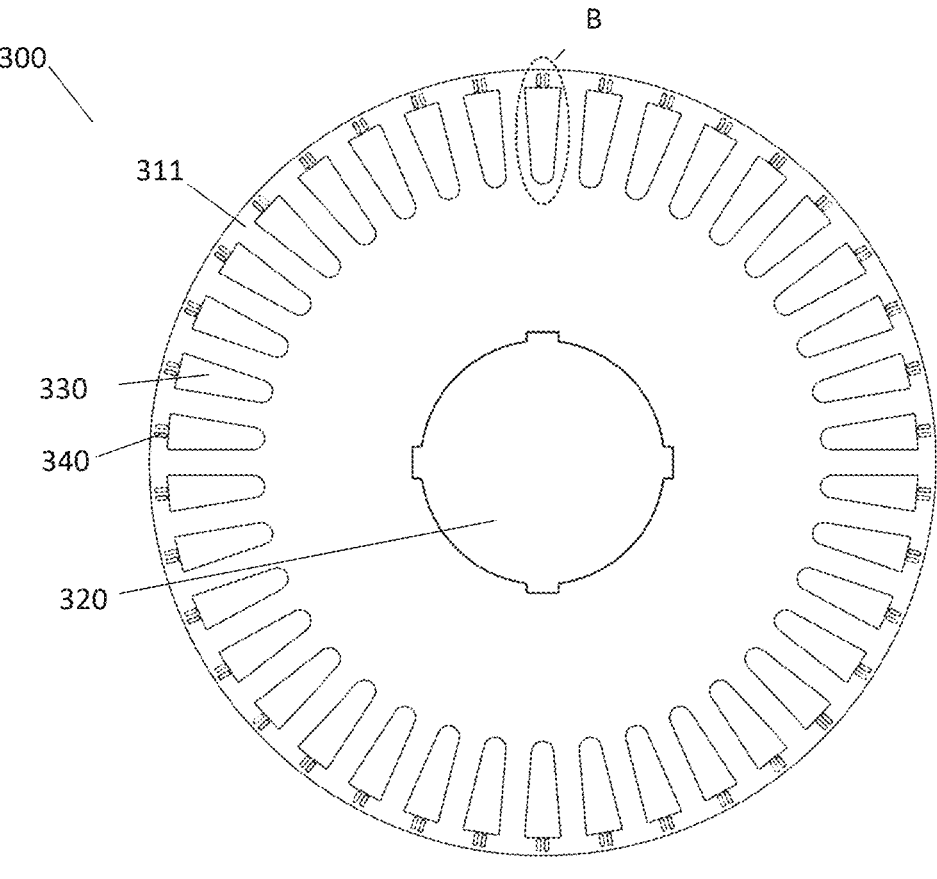
FIG. 4 shows a front view of a package of plates according to the invention.
Figure 5:
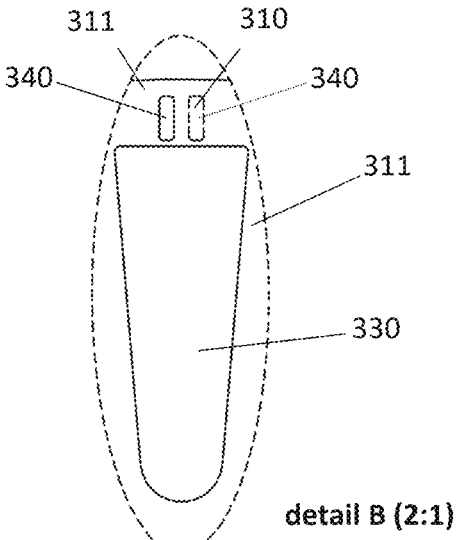
FIG. 5 shows an enlarged view of detail B from FIG. 4, highlighting the cover of the upper holes of the package of plates by the inverted plate surface.

The present invention relates to a rotor (100) comprising a shaft (200) and one or more package of plates (300).

The shaft (200) of the rotor (100) according to the invention is a shaft (200) known from the state of the art and of the type commonly used for application in rotary electric machines.

The package of plates (300) of the rotor (100) according to the invention is formed by a plurality of plates (310) made from material suitable for electric motors of the nature addressed herein, each plate (310) provided with a central hole (320), lower holes (330), which are through-holes, and upper holes (340), also through-holes, and there may be one or more package of plates (300), equal or different from each other, arranged on the same shaft (200) of the rotor (100).

The central hole (320) allows inserting the shaft (200) and may eventually be equipped with additional openings for passage over keys and other elements.

The lower holes (330), when aligned in the package of plates (300), form through-channels which will be filled with conductive material by a suitable process, joining fusion and injection under pressure, preferably by means of injection, forming through-bars of conductive material which have their ends joined by a short-circuit ring, forming the lower cage or working cage. The material used to inject the bars that will fill the through-channels of the lower holes (330) of the working cage must be an injectable material, preferably but not limited to aluminum and/or one or more alloys thereof.

The shape of the lower holes (330) of the plates (310) will preferably depend on the design specifications of the electric machine to which they are intended.

The upper holes (340), when aligned in the package of plates (300), form through-channels that will be filled with insulating material. The material that will fill the through-channels of the upper holes (340) should be a suitable material, preferably but not limited to air.

The shape of the upper holes (340) of the plates (310) will preferably depend on the design specifications of the electric machine to which they are intended.

The plates (310) are manufactured by means and processes known from the state of the art and usual for rotary electric machines of the nature addressed herein, which may be, for example, and not limited to stamping, mechanical cutting, laser cutting, injection, casting, sintering, and other related processes, provided they are appropriate.

The package of plates (300) is formed by grouping and parallel aligning a plurality of plates (310) with the holes (320, 330, 340) aligned with each other forming a package of plates (300).

In the rotor (100) according to the invention, at least one plate (310) at each of the ends of the package of plates (300) will be assembled as an inverted plate (311, 312), in an inverted manner in relation to the other plate (310), which means that the package of plates (300) will have, at both ends thereof, along the longitudinal shaft (200) of the rotor (100), at least one first inverted plate (311) and at least a last inverted plate (312), both inverted in relation to the other plates (310) arranged therebetween, delimiting the package of plates (300) at both ends.

In the context of the present invention, one end of the package of plates (300) should be understood as equivalent to a longitudinal end stretch of up to 20%, preferably up to 15%, preferably up to 10% of the total length of the package of plates (300), measured along the longitudinal shaft (200) of the rotor (100) from the end towards the inside of the package of plates (300). This means that the inverted plates (311, 312) can be arranged both at the ends and along an end section as defined above, and there may even be more than one inverted plate (311, 312) along the same end section. Thus, each package of plates (300) will have at least two end sections, one at each end thereof. Anyway, for the purposes of clarity of the present description, the plates that will undergo inversion will be called simply the first inverted plate (311) and the last inverted plate (312).

It should be noted that the first and last inverted plate(s) (311, 312) are preferably the same as the other plates (310), differing from these only by the assembly position on the shaft (200) of the rotor (100) which, as described above, is an inverted mounting position in relation to the assembly position of the others.

The package of plates (300) may have more than one inverted plate (311, 312) at each end thereof or end sections, depending on the electric machine design, dimensions, injection pressure and other related parameters.

If the rotor (100) is provided with more than one package of plates (300), each of the package of plates (300) may also be delimited at both ends or end sections by at least one first inverted plate (311) and by at least one last inverted plate (312).

The upper holes (340) are arranged in the plates (310) in an off-centered manner, preferably offset or mirrored in relation to the central radial shafts of the lower holes (330), so that the lower holes (330) are aligned over the same package of plates (300), but the sheet of an inverted plate (311, 312), assembled upside down, covers the upper holes (340) of the subsequent plate(s) (310). As such, the upper holes (340) of the inverted plates (311, 312) of the ends or end sections will not be aligned with the upper holes (340) of the other plates (310). The inverted plates (311, 312) at the ends will serve as caps or physical restrictors for the channels formed by the upper holes (340) of the internal plates (310) and/or arranged therebetween and/or therebefore and/or thereafter.

As such, it should be noted that one or more inverted plates (311, 312) may also be arranged, alone or together with one or more of the other plates (310), at other points in addition to the ends or end sections of the same package of plates (300), and the inverted plates (311, 312) will also serve as caps or physical limits for the channels formed by the upper holes (340) of the plates (310) arranged therebetween and/or therebefore and/or thereafter.

Once assembled, the package of plates (300) is arranged in an appropriate injection tool, provided with cavities to receive the package of plates (300) and cavities to allow filling the channels formed by aligning the lower holes (330) of the lower cage, said channels being physically separated from the channels formed by aligning the upper holes (340), increasing the dimensional stability and reliability of the process.

As such, the material of the lower cage does not penetrate the upper holes (340), keeping the channels formed by the upper holes (340) free of material, in particular free of conductive material, reducing high frequency losses.

The differentiated arrangement of the first and last inverted plate(s) (311, 312) of the package of plates (300), or of one or more groups of inverted plates (311, 312), by inverting them in the assembly, with or without plates (310) and even package of plates (300) inverted in the middle of the pack, and together with the separation of the upper hole (340) in relation to the lower hole (330), helps in the aluminum injection process in the lower bottom cage or working cage (filled with material), preventing aluminum from entering the air-filled hole during the injection process.

The holes (330, 340) of the rotor (100) according to the invention are filled with different materials, the upper hole (340) being filled with air so as to simulate an equivalent opening of the bridge of the rotor (100), and the lower or working hole (330) filled with conductive material through an aluminum injection process. The upper hole (340) being filled with air reduces high frequency losses in motors powered by a frequency converter, an effect that would not occur if the hole (340) were filled with a conductive material.

A process for manufacturing a rotor (100) according to the invention is a process for manufacturing a rotor (100) comprising a shaft (200) and at least one or more package of plates (300), in which at least one plate (310) from each of the ends or end sections of the package of plates (300) will be assembled as an inverted plate (311, 312), inverted in relation to the other plates (310), delimiting the package of plates (300) one or more times at both ends or end sections.

This process comprises the process steps of:

i. stamping the plates (310) with a central hole (320), lower holes (330) and upper holes (340);

ii. grouping and concurrently aligning a plurality of plates (310) with the holes (320, 330, 340) aligned with each other forming at least one package of plates (300);

iii. arranging one or more inverted plates (311, 312) in each end or end section of the package of plates (300), inverted or mirrored in relation to the other plates (310);

iv. arranging the package of plates (300) in an appropriate injection tool provided with cavities to receive the package of plates (300) and cavities to allow filling the channels formed by aligning the lower holes (330) of the lower hole;

v. injecting injectable material to fill the channels formed by the lower holes (330); and vi. pressing the shaft (200) into one or more package of plates (300) by inserting the shaft (200) through the center hole (320).

In a preferred non-limiting embodiment of the invention, step iii. may further comprise arranging one or more inverted plates (311, 312), alone or together with one or more plates (310), at points other than the ends or end sections of the same package of plates (300).

The manufacturing process according to the invention has important and striking differences in relation to the equivalent steps from processes for manufacturing rotors in the state of the art.

Execution times of the steps of the invention are reduced in relation to those of equivalent steps from the state of the art, given that there is no need to press or weld the package of plates (300) and, more importantly, additional tools and/or back pressure to insulate the upper hole (340) cavities during the injection process are unnecessary.

Using only one type of plates (310), the outermost ones serving as caps for the ends or end sections of the package of plates (300) are exactly the same as the other plates (310), does not require additional parts or components, reducing the number of motor items and thus improving the quality indexes in the assembly.

As such, the process according to the invention for manufacturing a rotor (100) according to the invention drastically reduces the manufacturing times for the type of rotors addressed herein, reduces material and labor costs, increases productivity, demand fewer steps and optimizes manufacturing capacity by bit requiring additional machinery or auxiliary devices. It should be noted that the process according to the invention may have other accessory steps, before and after those described above, according to the technical knowledge and manufacturing practices necessary for the construction of rotors for rotary electric machines.

A rotary electric machine according to the invention is an electric motor provided with a rotor (100) according to the invention manufactured according to a process according to the invention.

CONCLUSION

It will be easily understood by one skilled in the art that modifications may be made to the present invention without departing from the concepts set out in the description above. Such modifications should be considered as included within the scope of the present invention. Consequently, the particular embodiments previously described in detail are merely illustrative and exemplary, and not limitative in terms of the scope of the present invention, to which the full extent of the accompanying claims should be given, in addition to all and any equivalents thereof.

The invention claimed is:

1. A rotor for rotary electric machine, comprising:

a package of plates, wherein each package of plates of the rotor comprises, at both ends or end sections thereof, at least one first inverted plate and at least one last inverted plate, said plates being inverted in relation to other plates of the package of plates;

wherein the at least one first inverted plate and the at least one last inverted plate are positioned so as to physically cover and seal channels formed by upper holes of the other plates to prevent any conductive material injected into lower holes from migrating into the upper holes during manufacturing;

wherein the upper holes of the other plates are arranged in an off-centered, offset or mirrored manner relative to a central radial shaft of the lower holes, such that the lower holes remain aligned throughout the package of plates; and wherein the upper holes are filled with an insulating material, and the lower holes are filled with a conductive material.

2. The rotor according to claim 1, characterized in that the at least one first inverted plate and the at least one last inverted plate are identical to the other plates, differing only by their inverted orientation within the package of plates.

3. The rotor according to claim 1, characterized in that the at least one first inverted plate and the at least one last inverted plate can be arranged, alone or together with one or more of the other plates, at ends or end sections of the same package of plates, serving as physical restrictors for the channels formed by the upper holes at such positions.

4. The rotor according to claim 1, characterized in that the package of plates can have more than one inverted plate at each end or end section thereof.

5. The rotor according to claim 1, wherein the insulating material is air and the conductive material is selected from aluminum or an alloy thereof.

6. A method of manufacturing a rotor of claim 1, the method comprising:

i. stamping the plates with a central hole, lower holes and upper holes;

ii. grouping and concurrently aligning a plurality of plates with the holes aligned with each other forming at least one package of plates;

iii. arranging one or more inverted plates in each end or end section of the package of plates, inverted or mirrored in relation to the other plates;

iv. arranging the package of plates to allow filling the channels formed by aligning the lower holes of the lower cage;

v. injecting injectable material to fill the channels formed by the lower holes; and vi. pressing the shaft into one or more package of plates by inserting the shaft through the center hole.

7. A rotary electric machine manufactured by the method of claim 6.

8. A rotary electric machine comprising a rotor of claim 1.

* * * * *